F. F. MacLEAN.

HEADLIGHT.

APPLICATION FILED MAY 15, 1916.

Reissued Mar. 26, 1918. 14,448.

WITNESSES:
H. Hurst,
H. E. Chase

INVENTOR
F. F. MacLean

BY Howard P. Denison
ATTORNEY

UNITED STATES PATENT OFFICE.

FREDRICK F. MACLEAN, OF SYRACUSE, NEW YORK, ASSIGNOR, BY MESNE ASSIGNMENTS, OF ONE-HALF TO LUCIUS G. LACY, OF SYRACUSE, NEW YORK.

HEADLIGHT.

14,448. Specification of Reissued Letters Patent. Reissued Mar. 26, 1915.

Original No. 1,146,968, dated July 13, 1915, Serial No. 879,782, filed December 30, 1914. Application for reissue filed May 15, 1916. Serial No. 97,751.

*To all whom it may concern:*

Be it known that I, FREDRICK F. MACLEAN, a citizen of the United States of America, and resident of Syracuse, in the county of Onondaga, in the State of New York, have invented new and useful Improvements in Headlights, of which the following, taken in connection with the accompanying drawings, is a full, clear, and exact description.

This invention relates to certain improvements in headlights for automobiles, motor boats and similar vehicles in which an incandescent electric lamp is used in conjunction with a reflector for projecting an intensified light forwardly in the path of travel of the vehicle, and while this affords a clear vision of the roadway and distant objects ahead of the machine at night, the glare of the light is seriously objectionable to approaching horses, pedestrians and drivers of other vehicles in producing a more or less blinding effect upon the eyes with attendant dangers of accident.

I am aware that various devices have been proposed to screen or deflect the direct or reflected rays of light in head lights of this character so as to obviate the objectionable results referred to, and while that is the primary object of my invention, the specific object is to arrange the screening or light intercepting elements in such manner as to permit an intensified light to be projected the usual distance forwardly along and upon the surface of the ground in advance of the machine but below the normal plane of vision of approaching drivers, horses, or pedestrians, and at the same time to afford a subdued light throughout the remaining portions of the field of reflection.

In other words, I have sought to provide a specific form of screen or light-intercepting medium to be used in connection with the transparent bulb of an incandescent electric lamp and a converging reflector in such relation as to cause the illumination of a relatively large field entirely around the focal axis of the reflector by the less intense direct rays from the lamp as distinguished from the more intense reflected rays, and at the same time to confine the highly intensified reflected light to that part of the field which is below said axis or below the line of vision of approaching pedestrians, horses, and drivers of other vehicles.

Another object is to enable this lamp to be used in connection with any form of reflector for producing the results above referred to.

Other objects and uses relating to specific parts of the bulb will be brought out in the following description.

Figure 1:
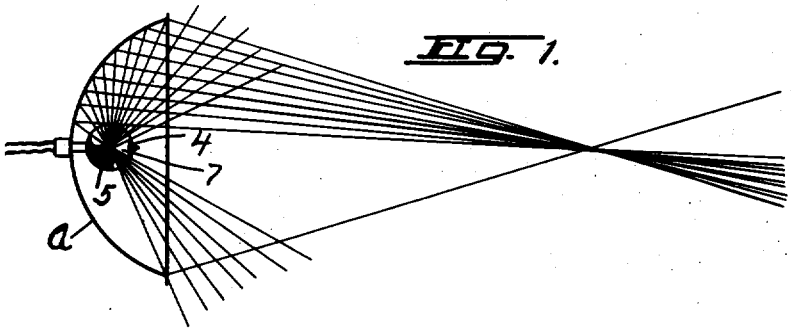
Figures 1, 2 and 3 are diagrammatic views of slightly modified forms of headlights embodying the features of my invention, and showing the lines of projection of the less intense direct rays and also those of the more intense reflected rays.
Figure 2:
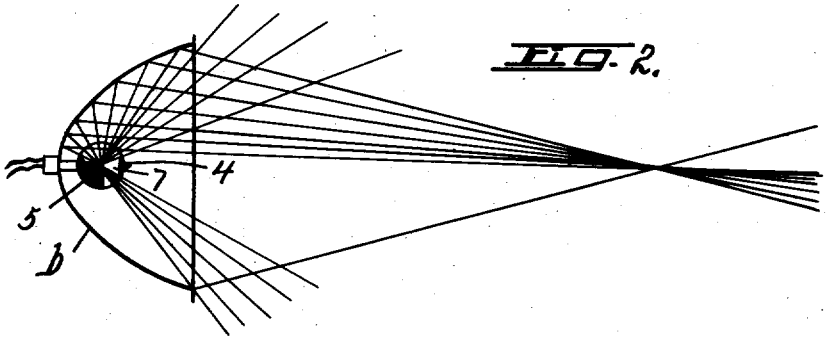
Figure 3:
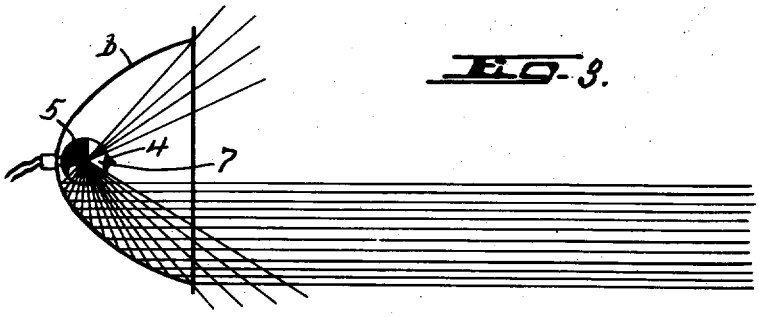

As illustrated, the headlight comprises a converging reflector as —*a*— Fig. 1, or —*b*— Figs. 2 and 3, an incandescent electric lamp having a transparent bulb —1—, a cylindrical base —2— and an incandescing filament —3—, and suitable light-intercepting mediums —4— and —5— of non-transparent substance.

The base —2— of the lamp may be secured in any well known manner in the apex of the reflector so as to support the filament —3— in approximately the focal axis at or near the focus of such reflector.

The light-intercepting mediums —4— and —5— preferably consist of coatings or covers of colorless translucent paint or enamel adhesively applied to certain portions of the bulb as hereinafter described, but it is evident that the invention lies more particularly in the structure and relative arrangement of the light-intercepting mediums with respect to the bulb, source of light and reflector than to the manner of supporting such mediums, and therefore comprehends any equivalent covering, whether permanent or separable.

Figure 4:
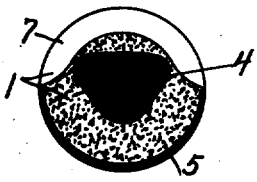
Figs. 4, 5, 6 and 7 are, respectively, a front end view, a side view, and opposite plan views of the incandescent electric lamp shown in the preceding figures and comprising a transparent bulb and my improved light-intercepting mediums used in connection therewith.
Figure 5:
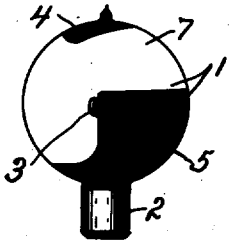
Figure 6:
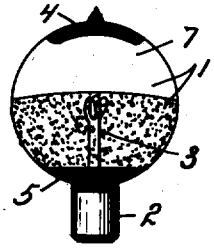
Figure 7:
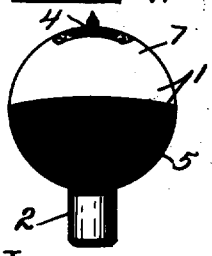

The light-intercepter —4— covers a relatively small area or zone of the front end of the bulb and is preferably of triangular form as shown in Fig. 4, with its center substantially coincident with the axis of the reflector for intercepting the direct rays immediately adjacent said axis.

The other light intercepter —5— is approximately quarter-spherical and covers a corresponding area of the rear half of the bulb so as to extend from the base —2— forwardly to a point in the periphery at or near the point of intersection of a direct line from the source of light to the front edge of the reflector, thus leaving an intervening uncovered annular zone —7— of the clear transparent bulb exposed for the transmission of the direct rays of less intense light into a relatively large area of the field entirely around the focal axis, while approximately the remaining rear half of the transparent bulb is also exposed to allow the transmission of the direct rays to the reflector for projecting the more intense reflected rays into the lower half of the field.

When the lamp is used in connection with a substantially spherical converging reflector as —*a*— Fig. 1, it is so arranged with reference to the focus of said reflector as to cause the reflector rays passing through the transparent portion of the bulb to be converged at a point in the produced axis of the reflector at a short distance in front of the same, so that the continued rays projecting beyond said point diverge downwardly in a plane below said produced axis upon the surface of the ground or path of travel of the vehicle a considerably farther distance in advance of the lamp or vehicle, and wholly below the plane of vision of an approaching driver, horse or pedestrian, and for this purpose the translucent intercepting zone —5— is disposed with its major portion below the horizontal plane of the axis of the lamp while the relatively smaller zone —4— will be located in said axis, thereby permitting portions of the direct rays from the incandescent filament to be projected forwardly and downwardly through the transparent zone —7— directly in front of the machine or vehicle, and also below the axis of the reflector. It is also evident that in the construction of reflector shown in Fig. 1, portions of the direct rays from the incandescent filament will be projected upwardly in front of the reflector considerably above the plane of vision of an approaching driver, thus producing a sufficient amount of spilled light to illumine the field without glare.

For convenience of description, the front and rear ends of the bulb may be termed the poles and the translucent portions at such ends may be termed the translucent polar zones, while the main body of the translucent portion —5— may be termed the semi-equatorial zone merging with the rear polar zone while the main body of the transparent portion —7— may be termed the circumferential transparent zone interposed between the translucent polar zones.

In Figs. 2 and 3, the lamp is used in connection with a parabolic reflector —*b*—, the semi-equatorial zone —5— being shown in Fig. 2 as located at the lower side of the bulb and in front of the focus of the reflector, while in Fig. 3 it is shown as located at the upper rear side of said bulb and just at the rear of the focus of the reflector so as to cause the rays of light passing through the transparent zone at the lower side of the bulb to be reflected forwardly in approximately parallel lines wholly below the produced axis of the reflector, while the direct rays emanating from the incandescent filament will be projected in forwardly diverging lines through the transparent portions of the bulb around the edges of the translucent polar zone —4—. The translucent zones may be formed by depolishing, sandblasting or otherwise treating these portions of the bulb so as to increase their light absorbing power to such an extent as to render them translucent for the purpose of subduing the intensity of the light to the desired degree without color.

I have mentioned that the lamp shown in Fig. 3 is located just at the rear of the focus of the reflector, the object of which is to cause the reflected rays of light to project forwardly in slightly diverging lines, but it is evident that the lamp might be located exactly at the focus of the reflector so as to cause said rays to be reflected forwardly in parallel lines. I have also mentioned that the lamp in Fig. 2 is located in front of the focus of the reflector, the object of which is to cause the reflected rays from the upper portion of the reflector to be projected forwardly in downwardly converging lines meeting at a point a short distance in advance of the head light to cause the continued rays to be thrown upon the ground a still farther distance in advance of the machine, but wholly below the plane of vision of an approaching driver, horse or pedestrian. It is, therefore, evident that the lamp may be used with equal efficiency in connection with the approximately spherical reflector shown in Fig. 1 or with the parabolic reflectors shown in Figs. 2 and 3, and that the lamp may be placed in such manner as to bring the translucent zone —5— either above or below the horizontal plane of the axis of the parabolic reflector, but when used in connection with the spherical reflector, the translucent zone —5— should be located below the plane of said axis so as to throw the rays of light forwardly and downwardly upon the surface of the ground in front of the machine and in a plane wholly below the plane of vision of the driver of an approaching machine or of an approaching horse or pedestrian.

What I claim is:—

1. In a head light for vehicles in combination with a reflector, an incandescent electric lamp having its front portion provided with a translucent polar zone intercepting said axis and a semi-equatorial translucent zone mainly in the plane at the rear of the source of light, portions of the bulb between the translucent zones being transparent.

2. In a head light for vehicles in combination with a reflector, an incandescent electric lamp having a substantially spherical bulb provided with a front translucent polar zone of relatively small area, a rear translucent polar zone and a semi-equatorial translucent zone merging with the rear translucent zone, the portions of the bulb between the semi-equatorial zone and front polar zone being transparent.

3. The combination with a converging reflector of an incandescent electric lamp therein having approximately one quarter of the area of the bulb nearest the socket and a relatively smaller area at its front end translucent, and its remaining portions transparent, the main body of the translucent portion nearest the socket being located at one side of the horizontal plane of the axis of the reflector.

4. In a headlight, a reflector and an incandescent lamp bulb having an annular translucent polar zone at its base and a semi-annular translucent zone merging with the first named zone and terminating in a plane near that of the center of the bulb, the portions of the bulb in front and at one side of the semi-annular zone being transparent.

5. In a headlight, a reflector and an incandescent lamp bulb having an annular translucent polar zone at its base and a semi-annular translucent zone merging with the first named zone and terminating in a plane near that of the center of the bulb, the portions of the bulb in front and at one side of the semi-annular zone being transparent, said bulb having its front end provided with a translucent zone of relatively small area.

6. In a headlight, a converging reflector, in combination with an incandescent electric lamp having a bulb and translucent means for intercepting the direct rays from the source of light to the reflector at one side of the axis thereof from a point at the rear of the source of light to an arc through which the direct rays across the edge of the reflector pass.

7. In a headlight, in combination with a converging reflector, an incandescent electric lamp having means for projecting direct rays from the source in diverging paths entirely around the produced axis of the reflector and also to all portions of said reflector around said axis, a translucent light intercepter at one side of the axis of the reflector, and at the rear of lines drawn from the source of light through the edge of the reflector, and an additional translucent light intercepter in said axis at the front of the source of light.

8. A headlight comprising in combination with a concave reflector and an incandescent electric lamp in the focal axis thereof, of a light intercepting medium positioned between the lamp and a portion of the reflective surface of the reflector at one side of a plane passing through said axis and adapted to intercept the direct rays which would otherwise impinge directly upon said portion of the reflective surface exclusive of the rays which at the same side of said plane pass directly through the open end of the reflector, and a relatively smaller light-intercepting medium surrounding said axis directly in front of the lamp.

9. In a headlight, the combination with a converging reflector and an incandescent electric lamp therein, of a light-intercepting medium extending partly around the bulb from approximately the transverse plane of the source of light to the side nearest the base of the reflector and mainly at one side of the horizontal plane of the focal axis, and another light-intercepting medium of relatively small area covering the front side of the bulb in and immediately around said axis.

10. In a headlight, the combination of a converging reflector, an incandescent electric lamp therein, means for intercepting portions of the direct rays from the lamp to one side only of the reflector and allowing other direct rays to pass beyond said reflector entirely around the axis thereof, and additional means for intercepting other direct rays in and immediately around the focal axis in front of the source of light.

In witness whereof, I have hereunto set my hand this 1st day of May, 1916.

FREDRICK F. MACLEAN.

Witnesses:

H. E. CHASE,

ALICE M. CANNON.